United States Patent Office 2,884,832
Patented May 5, 1959

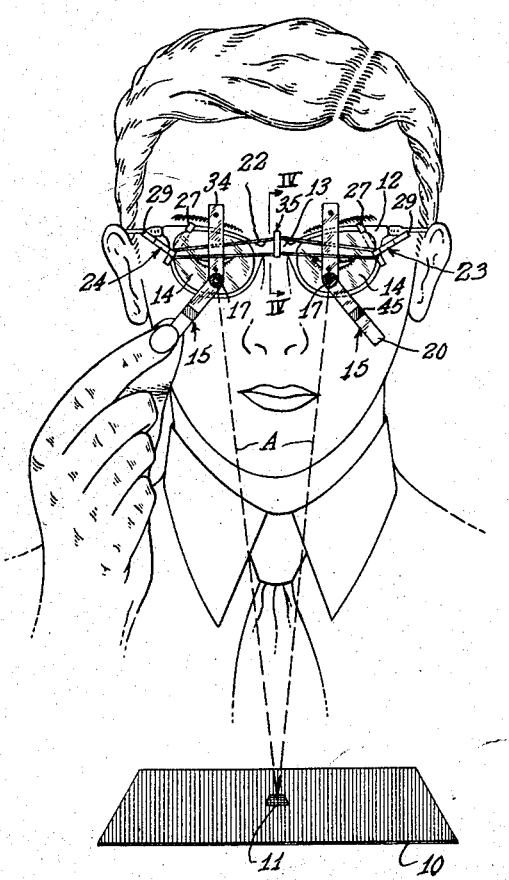
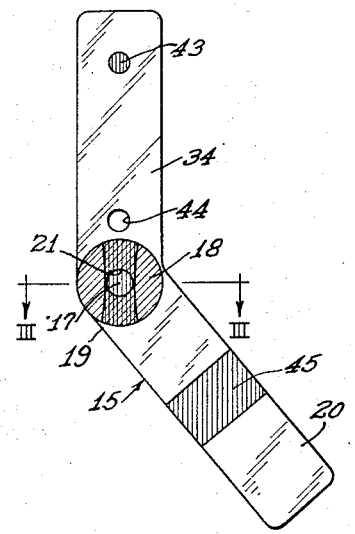
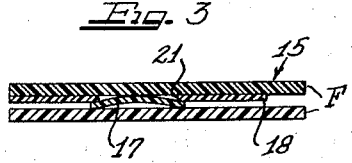
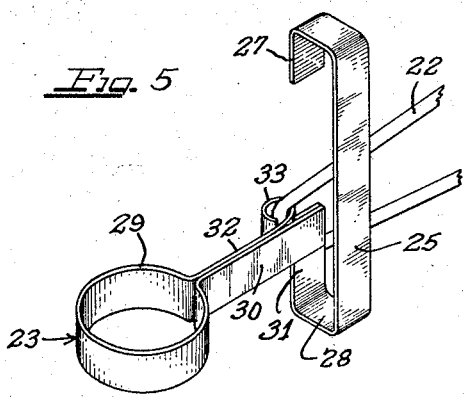
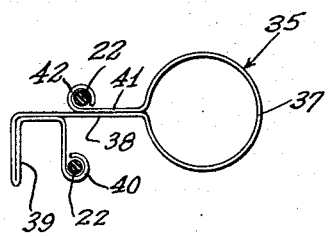

2,884,832

MEANS FOR EFFECTING CERTAIN MEASUREMENTS IN THE FITTING OF EYEGLASSES

Otto R. Engelmann, Chicago, Ill.

Application April 13, 1953, Serial No. 348,454

2 Claims. (Cl. 88—20)

The present invention relates to improvements in optometry, and more particularly concerns the more accurate attainment of certain optometrical measurements in arriving at proper prescription in multi-focal and higher lens power eyeglasses.

Two important measurement factors in arriving at the proper optometrical results in the prescription and fitting of eyeglasses involving multi-focal, and most generally bifocal lenses have offered problems for which no simple, inexpensive and convenient solution has been provided. The most serious of these problems has resided in attaining proper measurements of near torque pupillary distance, and the other of these problems has been concerned with the determination of the proper height or elevation limit of bifocal segment disposition.

While the placement of ophthalmic lenses of less than one diopter before the human eye does not present any critical demands upon coincidence of optical centers of the ophthalmic and eye lens systems, off center placement of lenses of higher lens powers may cause substantial visual discomfort and strain.

Determination of the placement of ophthalmic lens centers with relation to the optical centers of the eyes has commonly been effected by the more or less rule of thumb measurement of the pupillary distance with a millimeter ruler held across both eyes while the patient looks straight ahead or horizontally. This does not take into account, however, the differences in the near torque pupillary distance as compared with the straight ahead or horizontal measurement. Moreover, the margin of error is rather high.

When the eyes are rotated downward as in reading or working, the near convergence caused by the torsion or torque due to the forward shifting of the centers of rotation of the eyes results in a widening of the space between the foveae centralis of the eyes. Since the eyes are more egg-shaped than spherical, the centers of rotation are necessarily shifted forward when looking down, causing the visual axes of the eyes to pass through respective areas on the ophthalmic lenses which are located inside and much narrower in measurement than when the pupillary distance is measured from a horizontal or straight ahead position. In practice, I have found the differential between straight ahead and near torque pupillary distance as much as 11 millimeters.

Another facet of the problem concerns the depth of setting of the eyes under consideration. A deep set pair of eyes, with substantial space betwen the eyes and the lenses requires a narrower pupillary distance placement when looking down, than eyes that are disposed closer to the lenses.

Heretofore guesswork or rule of thumb compensation for the near torque pupillary distance differential as compared with straight ahead pupillary distance measurement has been relied upon. This explains why too often bifocal segments are found placed too far apart, or otherwise misplaced for proper near convergence vision.

An important object of the present invention is to provide a novel method and means for finding the ideal placement of the optical centers of ophthalmic lenses with relation to the optical centers of patients' eyes, in prescribing high power lenses by locating that area or section on respective ophthalmic lenses through which the visual axis of the associated eye must pass, so as to effect substantial coincidence of lens axis with the theoretical straight line connecting the foveae centralis for either far or near vision or both, as the case may be.

Another object of the invention is to provide a novel method and means for assuring practical placement of the optical centers of bifocal or reading glasses into those areas of the lenses most used by the patient when looking down, by subjective measurement of the near vision pupillary distance of the eyes, taking into consideration the effects of the near convergence torsion and also the distance of the ophthalmic lenses from the eyes when looking down.

Annoyance and discomfort for wearers of multi-focal glasses is often caused by improper height or elevation of the reading lens segments in the eyeglass lenses.

It is accordingly another object of the present invention to provide a novel expedient for ready determination of the ideal elevation or height limit of reading or bifocal lens segment placement for individual requirements.

Other objects, features and advantages of the present invention will be readily apparent from the following detailed description of a preferred embodiment thereof taken in conjunction with the accompanying drawing in which:

Figure 1 is a more or less schematic view demonstrating the use of the invention for near torque pupillary distance measurement;

Figure 2 is an enlarged elevational view of one of the centering filter members of the apparatus of the present invention;

Figure 3 is an enlarged more or less schematic sectional detail view taken substantially on the line III—III of Figure 2;

Figure 4 is an enlarged sectional elevational view showing the bridge clamp member of the centering filter holding device of the apparatus; and Figure 5 is a perspective view of one of the end clamp members of the apparatus.

According to the present invention a method of measuring pupillary distance is provided, which comprises placing before a patient's eyes, in the position normally occupied by eyeglass lesses, respective small orifices, preferably comprising colored disks surrounded by respective areas of a color which cancels the color of the disks, and directing vision of the eyes through the orifices into a point of fixation, preferably on an area of the same color as the orifice disks and spaced a predetermined distance from the patient's eyes.

In a practical manner of accomplishing this method, the patient is directed to look at a target point on a panel or chart hung on a wall or otherwise supported where far vision pupillary distance is to be measured. For near vision pupillary distance measurement the patient is provided with a panel 10 having a brightly colored, preferably phosphorescent viewing surface which, as shown in Figure 1 may be red. Centered on the colored surface is a black fixation point or target 11. The panel 10 is preferably of elongated rectangular form and the patient will hold the panel with the long dimension transversely at his usual reading distance, in the normal reading position with the colored viewing surface facing toward him. In practice the panel 10 may comprise a card of approximately 10 by 6 inches and the target 11 may comprise a 1 inch square centered on the brightly red colored viewing surface.

In the instance illustrated in Figure 1, the patient is depicted as wearing a pair of eyeglasses 12 having a bridge 13 and a pair of respective lenses 14. If the patient does not have his own glasses, the frame he selects for his subsequent use is mounted on his face. Then a pair of preferably identical centering filters 15 are respectively disposed upon the eyeglass frame in front of the patient's eyes and adjusted so that coincidence of small measuring orifice disks 17 of preferably the same color, in the present instance red, as the viewing surface of the card 10, with the converging near vision focal axes "A" of the eyes on the target 11 is attained.

In a practical construction, the centering filter disks 17 comprise, in each instance, a small, transparent, red center pupil of 4 or 5 millimeter diameter surrounded by a transparent area of a complementary color to the viewing surface of the target card, in the present instance green and which may be of 15 to 22 millimeters in diameter. The red pupil member 17 and the green surrounding area 18 are preferably constructed of suitable hardened plastic material supported by a plastic body 19 having an elongated handle portion 20 by which the centering filter pupil 17 can be conveniently manipulated.

By preference the pupil 17 is constructed in the form of a lens of about 6 diopters of cylinder at axis 90° in order to aid in obtaining quicker results by cooperation of the patient. This construction is attained as best shown in Figures 2 and 3 by providing the green area member 18 as a disk having a central pupil opening 21 of the proper diameter, while the red pupil 17 comprises a vertically elongated plastic strip of approximately the same length as the outside diameter of the green filter area disk 18 and of a width slightly greater than the diameter of the pupil opening 21. The pupil member 17 and the green area disk 18 are disposed in centered laminar relation between opposed matching transparent plastic facing plates F comprising the supporting body 19, and the assembly is fused together. For this purpose a thermoplastic material is desirable. As a result, the central portion of the pupil member 17 draws into the pupil aperture 21 and affords the cylindrical axis lens for the centering pupil. In Figure 3, of course, for purpose of illustration the drawn in, cylindrical lens form of the pupil member 17 is depicted while the facing panels F are for purpose of illustration shown separated, but actually in the finished article all laminar portions of the assembly are fused together.

For operatively supporting the centering filter member 15, in each instance, in position on the patient's eyeglasses or eyeglass frame, retaining means are provided which will enable ready manual adjustment of the centering filters by the examining doctor or by the patient himself. To this end, there is provided a friction device arranged to be mounted upon the front of the eyeglass frame and cooperative with the frame to press the centering filters in manually yieldably adjustable relation against the respective lens supporting portions of the frame or against the eyeglass lenses, as the case may be. In a convenient form, the friction device comprises a slotted rubber member 22 which may be in the form of a rubber band, the term "rubber" being used in a generic sense to designate either natural or synthetic rubber having substantial elasticity and external surface frictional characteristics.

For mounting the elastic friction band 22 in operative relation upon the eyeglass frame 12, respective left hand and right hand attachment clamps 23 and 24 are attached to the respective opposite ends of the elastic band and are so constructed and arranged that the attachment clamps can be easily and quickly attached to the eyeglass frame while the latter is on the patient's face, if desired. Through this arrangement, the elastic band 22 is stretched from a relaxed condition shorter than the total width of the eyeglass frame to a reasonably taut condition bearing firmly against the lenses 14, or extending substantially taut across the eyeglass frame sockets close to the front plane of the frame sockets, in the absence of lenses.

In a convenient form, the attachment clamps 23 and 24 may be made from sheet metal or plastic material and of substantially identical though complementary left hand and right hand form. In Figure 5 is shown the attachment clamp member 23 and it will be understood that a detailed description thereof will apply equally to the attachment clamp 24, although the latter is appropriately modified to adapt it for use at the right side of the eyeglass frame. For engaging the eyeglass frame, the attachment clamp is provided with a frame-engaging portion 25 which may be formed from a strip of material having an upper generally U-shaped return bent frame-engaging terminal portion 27 and a lower complementary, similar generally U-shaped return bent frame-engaging terminal portion 28. The terminal portions 27 and 28 are spaced apart sufficiently to enable hooking the upper terminal 27 over the top of the eyeglass frame with the body of the clamp portion 25 disposed behind the frame adjacent the temple mount of the associated eyeglass socket of the frame. The lower terminal 28 of the clamp is engaged about the adjacent outer side of the eyeglass frame socket.

For manipulating the attachment bracket or clamp, in each instance, it is provided with a handle 29 which may comprise a reverse bend longitudinal endwise prolongation of the lower terminal 28. Thereby the bracket can be made from a single continuous strip. In the illustrated embodiment however, the handle 29 comprises a separate sheet metal strip formed into loop shape with an elongated radially extending arm 30 thereof secured fixedly to an outer arm extension 31 of the lower clamp terminal 28. As will be clear, the clamp can be readily manipulated by means of the handle 29 into engaged position on the eyeglass frame.

For connection to the frame clamp of the elastic band 22, the handle portion 29 is provided with a radial leg extension 32 extending parallel to and in facewise opposition to the arm 30 and terminating in an eye curl 33 through which the associated end portion of the elastic band is accommodated in attached relation. By having the eye terminal 33 located at the front of the lower clamping terminal 28, it will be observed that the tension of the elastic band 22 as it is stretched across the front of the eyeglass frame in the mounting of the respective clamps 23 and 24 on the frame will draw the clamps into snug engagement with the frame, and more particularly acts upon the lower clamping terminals 28 to hold them securely against the respective outer sides of the eyeglass frame socket portions.

With the elastic band 22 stretched across the lens sockets of the eyeglass frame, an upwardly directed retaining arm 34 on each of the centering filter members 15 is engaged through the generally horizontal slot provided by the stretched band, by passing the arm 34 behind the lower strand of the elastic band and over the upper strand of the band. The lower strand of the band acts to draw the centering filter, in each instance, inwardly into snug engagement with the lens 14, or the lower portion of the lens socket of the frame, and at the same time presses the engagement arm 34 firmly against the upper strand of the band. As a result the centering filter 15 in each instance is held in firm frictional engagement enabling, however, up and down or sidewise sliding shifting thereof by overcoming the frictional resistance afforded by the retaining device.

For convenience in manipulation, the handle portion 20 and the attachment leg 34 of the centering filter member 15 are preferably disposed in generally dog-leg relation. Thereby, when the attachment leg 34 is in generally upright or vertical position, the handle 20 extends obliquely downwardly and laterally and generally away from the adjacent cheek of the patient into convenient manipulating position.

In order to hold the lower strand of the elastic band 22 off of the bridge of the patent's nose and at the same time to hold the upper and lower strands of the stretched band apart to maintain the slot between the strands generally open, a central bridge clamp and strand separator 35 is provided. While this bridge clamp and separator may be formed from suitable plastic or other material, it may conveniently comprise a sheet metal strip shaped into the desired form. Accordingly, the member 35 comprises a handle loop 37 having a radially extending arm 38 carrying a return bent generally U-shape downwardly opening clamp portion 39 dimensioned to engage upon the bridge 13 of the eyeglass frame. An outside terminal loop eye 40 on the clamp portion 39 has the lower strand of the elastic band engaged therethrough. For engaging the upper strand of the elastic band 22, the loop 37 is provided with an upper radially extending arm 41 terminating in an upper curl 42 disposed preferably vertically above the eye curl 40, and having the upper strand of the elastic band engaged therethrough. The spacing of the eye loops or curls 40 and 42 is predetermined to maintain the preferred spacing between the strands of the elastic band 22. By having the lowermost of the curls of the strand eyes 40 appropriately spaced below the clamp arm 38, with relation to the type of eyeglass frame with which the device is to be used, assurance is had that the lower strand of the elastic band will be held above the bridge of the patient's nose and thus avoid any discomfort. Moreover, the clamp 35 cooperates with the side clamps 23 and 24 to hold the elastic band close to the front of the frame for efficient cooperation with the centering filters.

For ready visual identification of the attachment leg 34 of the centering filter device, to assure proper disposition of the centering filter in use, some sort of ready identification indicia is preferably applied to the attachment leg. In the present instance, the upper portion of the attachment leg is provided with a spot of color indicia 43 which may be a red dot fused between the laminations of the centering filter member. Thereby, verticality of the lens axis of the filter pupil 17 is assured when the attachment leg 34 is in upright position in front of the patient's eye.

In the use of the centering filters 15 for practicing the method of the present invention for determining near torque pupillary distance, the patient is handed the target card and instructed to hold it at his usual reading distance in the reading position and with the phosphorescent red surface and the target point 11 facing toward him. The elastic band 22 is then mounted on the front of the patient's glasses or the frame that he may have selected for a new pair of glasses, by attaching the side clamps 23 and 24 and 35. The centering filters 15 are then put in place on the bridge clamp by the doctor. While one eye is occluded, the patient is requested to move the centering filter 15 in front of the other eye, by manipulating the handle 20, to center over the black spot provided by the target area 11 the floating, bright red ball he sees through the filter pupil 17 on the target card 10. The green area 18 about the centering pupil 17 causes the remainder of the surface of the target card 10 to appear black, so that what the patient sees is the ultimate adjustment of the centering filter is a black target spot in the center of a red ball surrounded by a black area. Then the occluded eye is opened and the other eye is occluded and the same steps of centering upon the target 11 are followed. Both eyes are then opened and coincidence of the red balls seen through both eyes and coincidence of the black targets in the centers of the red balls indicate fixation of the area of the ophthalmic lenses which must coincide with the visual axes A for near convergence. The vertical lens axis of the filtering pupil 17 assists in centering of the target area 11 since unless true coincidence or centering of the pupils with respect to the target area 11 is attained, the target area will appear as laterally displaced when viewed with one eye as compared to the other eye.

For far vision measurement, similar adjustment of the centering filter members may be effected by fixation upon a distant target.

After fixation has been attained, measurement of the distance between the two red pupils may be effected with high practical accuracy with a millimeter ruler. The resulting measurement includes allowance for lens distance from the eyes as well as torsion. If desired the spacing between the filtering pupils may be marked directly on the lenses 14 of the patient's glasses as by inserting a wax pencil through respective marking apertures 44 in the attachment arms 34 of the respective filtering members 15 immediately above the pupil area of the filter devices at the elbow between the arm 34 and the handle 20.

In order to attain a mean measurement between horizontal near and torque near vision, a millimeter distance halfway between near horizontal pupillary distance and torque pupillary distance may be prescribed. For example, where the horizontal pupillary distance for near vision is 62 millimeters and the near torque pupillary distance is 54, the prescription may be 58 millimeters.

For finding the height limit of bifocal placement, the handle portions 20 of the filtering devices 15 are preferably provided with respective horizontal gauging means generally representative of bifocal segments, herein comprising on each of the filtering devices 15 a red segment simulating area 45 fused between the laminations of the handle 20 preferably midway between the ends of the handle. The upper and lower boundaries of the red area 45 may be provided straight across, normal to the longitudinal axis of the handle 20. Hence, while having the filter devices held in place on the lens or eyeglass frame, the red areas 45 of the filter devices are moved into the position of bifocal segments of the lenses. Then, while having the patient stand a substantial distance from a white chart and fixating upon the chart horizontally, the handle portions 20 are moved vertically to position the red bifocal segment measuring areas 45 so that the patient can just see clearly over the upper border of the red area. Thereby the proper vertical disposition of the upper edge of the bifocal segment in each lens is properly determined for the patient's individual needs.

By the present invention, prismatic displacement ordinarily caused by decentration or wrong placement of the optical centers in multi-focal lenses is avoided. The placement of very small bifocal segments in eyeglass lenses is greatly facilitated. While the method and apparatus of the present invention are particularly useful for near vision axis determination for the normal user of bifocal or trifocal lenses, proper placement of the optical center into the most used lens area is of particular importance to the one eyed patient or the aphakic patient wearing heavy plus lenses.

It will be understood that modifications and variations may be effected without departing from the scope of the novel concepts of the present invention.

I claim as my invention:

1. In combination in apparatus for determining with optimum accuracy the interoccular distance at the lens plane of a pair of eyeglasses during near torque focusing of a person's eyes for location of reading segments of multi-focal eyeglass lenses, means to extend clampingly across the front of the eyeglass lens area of the person's own eyeglass frames, means for removably securing said clamping means in place on the eyeglass frame, and respective position determining members frictionally engageable by the clamping means to clamp the respective members in universally slidably adjustable relation upon the frame at the lens plane, each of said members having a handle portion thereon engageable to move the member slidably as clamped against the frame into alignment with the respective focal axis of each eye as the person focuses upon a target area disposed at normal reading position and plane, each of said members having therein a marking hole through which a marking pencil can be applied to mark the lens segment position on the respective lens in the associated lens area of the eyeglass frame.

2. In combination in apparatus for determining with optimum accuracy the interoccular distance at the lens plane of a pair of eyeglasses during near torque focusing of a person's eyes for location of reading segments of multi-focal eyeglass lenses, a friction device comprising an elongated yieldably biased friction member disposed to extend clampingly entirely across the front of each of the eyeglass lens areas of the person's own eyeglass frames and means for removably attaching the device in place on the eyeglass frames with the clamping member pressing in each eyeglass lens area into engagement with the frame or a respective lens in the lens area, and respective flat thin strip-form reading segment position determining filter members for interposition between the clamping member and the eyeglass frame or the lens in each lens area to be frictionally movably clamped thereagainst by the clamping member but in universally slidably adjustable relation, each of said position determining members having a handle portion thereon projectable beyond the eyeglass frame for grasping of the handle by the person wearing the frame to move the position determining member slidably in its plane as clamped against the frame or lens, and each of the position determining members having an approximately four or five millimeter sighting pupillary disk area of a color matching the color of a target panel for focusing upon the target panel to line up the sighting area with the pupillary axis of each eye focusing upon a target spot on the panel, by slidably manipulating the position determining member by manipulation of the handle.

References Cited in the file of this patent

UNITED STATES PATENTS

| Number | Name | Date |
| --- | --- | --- |
| 339,676 | Miles | Apr. 13, 1886 |
| 569,117 | Mosher | Oct. 6, 1896 |
| 855,022 | Smith | May 28, 1907 |
| 1,263,713 | Smith | Apr. 23, 1918 |
| 1,452,909 | Covelle | Apr. 24, 1923 |
| 1,505,447 | Uhlemann | Aug. 19, 1924 |
| 1,601,394 | Hunsicker | Sept. 28, 1926 |
| 1,687,055 | Capstaff | Oct. 9, 1928 |
| 1,981,438 | Smith | Nov. 20, 1934 |
| 1,981,439 | Smith | Nov. 20, 1934 |
| 2,022,202 | Hersch | Nov. 26, 1935 |
| 2,207,411 | Pierce | July 9, 1940 |
| 2,286,474 | Durham et al. | June 16, 1942 |
| 2,305,059 | Blocker | Dec. 15, 1942 |
| 2,410,729 | Glazer | Nov. 5, 1946 |
| 2,491,312 | Henry et al. | Dec. 13, 1949 |
| 2,519,428 | Birch-Field | Aug. 22, 1950 |
| 2,536,367 | Holmes | Jan. 2, 1951 |
| 2,574,749 | Mendelsohn | Nov. 13, 1951 |
| 2,596,264 | Macbeth | May 13, 1952 |
| 2,677,894 | Belgard | May 11, 1954 |